United States Patent Office 3,545,120
Patented Dec. 8, 1970

3,545,120
FLOAT FOR GILL NET
Yasunori Takaoka, Kobe-shi, Japan, assignor to Naigai Rubber Industry Co., Ltd., Akashi-shi, Hyogo-ken, Japan, and Ohmi Netting Co., Ltd., Shiga-ken, Japan, both corporations of Japan
Filed May 23, 1969, Ser. No. 827,392
Int. Cl. A01k 93/00
U.S. Cl. 43—44.9
4 Claims

ABSTRACT OF THE DISCLOSURE

A float for gill net characterized in that the float is provided with a bore for receiving therein a float line and two bores for receiving hanging lines which are formed at right angles with respect to the former bore.

The present invention relates to a float for gill nets and more particularly a float having the configuration suited for hanging the gill net with hanging lines.

There has been known a float of the type having a through bore for passing a float line there through so as to be held securely in position relative to the float line. There has been widely used a gill net of the type which is directly fitted to the float line and the float of the present invention is suited for use not only with such gill net and but also with a gill net of the type in which the hanging lines are suspended from the float line floating upon the surface of the water and the extra line is attached to these hanging lines so as to extend in the water in parallel with the float line and to have the gill net hung therefrom.

In brief, the float of the present invention is characterized by the provisions of a through bore for receiving the float line and through bores for receiving said hanging lines formed at right angles with respect to said float line bore. The above and other objects, features and advantages of the present invention will become more apparent from the following description taken in conjunction with the accompanying drawings in which.

Figure 1:
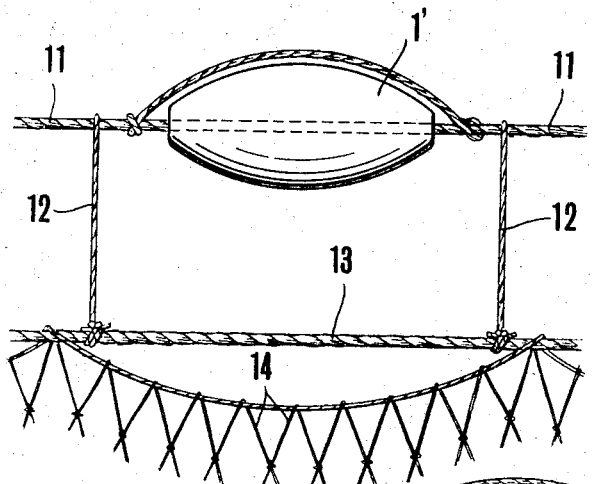
FIG. 1 to FIG. 3 are schematic illustrations of ordinary floats fitted to said gill nets of the type being suspended or hung under the water surface.
Figure 2:
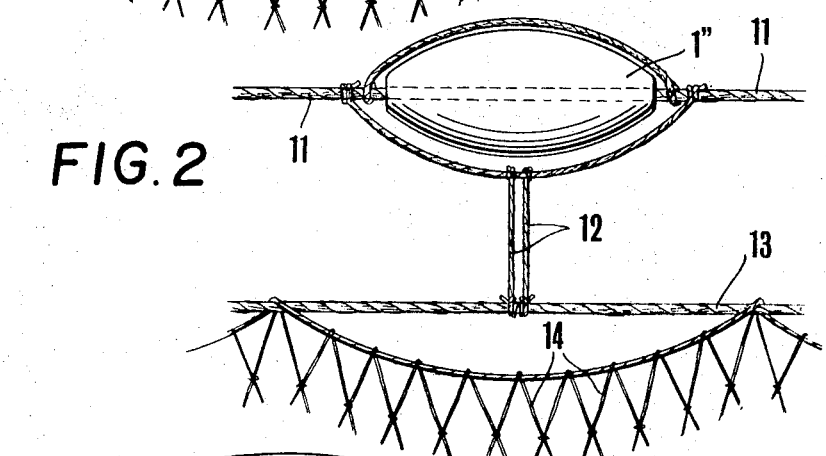
Figure 3:
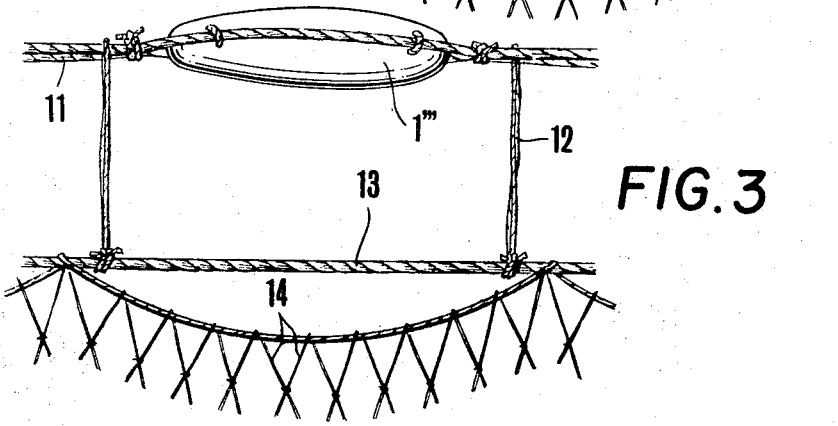

Referring now to FIG. 1, when the conventional float 1' is fitted to the gill net of the type described above, the gill net 14 is supported by an extra line 13 which is hung by hanging lines 12, the upper ends of which are fixed to the float lines 11 extending from the ends of the float 1'. In this arrangement, the number of hanging lines 12 is increased so that they disadvantageously tend to cause troubles in the sea such as catching floating articles or being entangled. In case of the arrangement as shown in FIG. 2, the hanging lines extend just below the center of the float 1" and are connected to the extra line 13. In this case, it is difficult to tie the hanging lines just below the center of the float 1" and moreover the knots tend to be displaced so that the float 1" will not remain stationary. Consequently, the float lines 11 are not extended straightly so that the gill net 14 can not be maintained stable. Even when the flat type float 1''' is used as shown in FIG. 3, the extra line 13 and the gill net 14 must be hung by two hanging lines 12 so that much material and labor will be required in the fabrication of the gill nets.

However, the float of the present invention may be very advantageously used with the gill net in which the float lines are separated from the net which is hung in the sea water.

Figure 4:
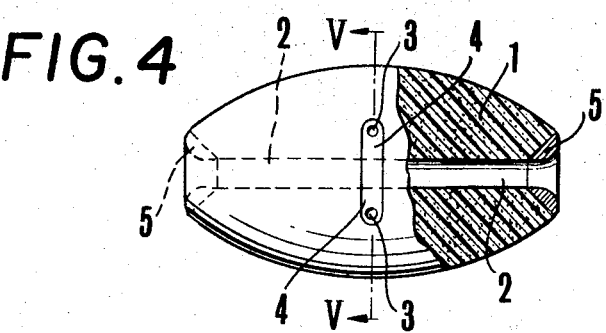
FIG. 4 is a plan view with a partial section of a float of the present invention.

Referring now to FIG. 4, the float body 1 may be in a proper shape and made of a material having a small specific gravity such as closed-cellular foamed body of synthetic resin. The float is provided with a through bore 2 formed at the center of the float for the float line and with through bores 3 for hanging lines disposed at right angles with respect to the float line bore 2. But the hanging line bores 3 are not intersected with the float line bore 2 and one hanging line may be fitted into one of the bores 3, extended therethrough and over the top portion of the float 1, then fitted again into another bore 3 and extended therethrough downwardly.

Figure 5:
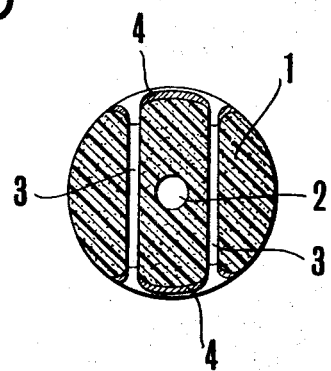
FIG. 5 is a longitudinal sectional view taken along the line V—V of FIG. 4.

When the strength of the material of the float 1 is not sufficient, suitable reinforcing materials designated by the reference numbers 4 and 5 in FIGS. 4 and 5 may be disposed at the openings of the bores so that the float body may withstand severe conditions without fracture even when the impact is exerted on the float.

Figure 6:
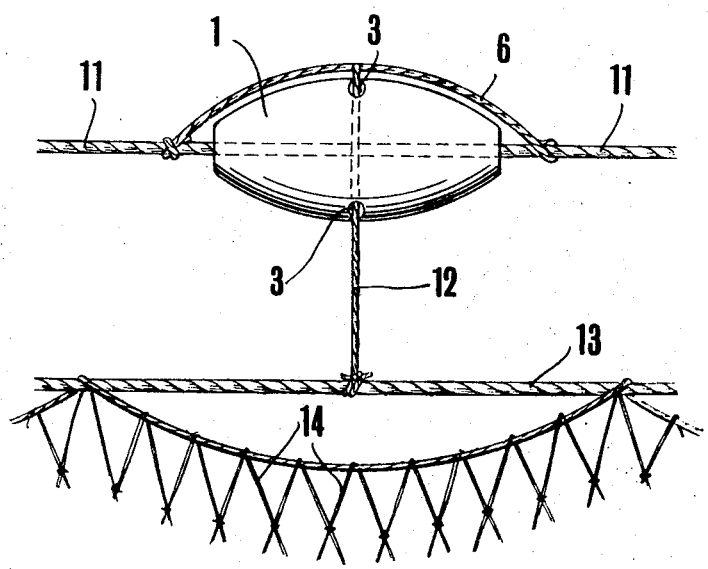
FIG. 6 is a schematic illustration of the float of the present invention fitted to the gill net of said type.

The float 1 of the present invention may be used as a float for the gill net as shown in FIG. 6. That is, the float line 11 is made to pass through the float line bore 2 while the hanging line 12 through the bores 3 and the extra line 13 is hung by the hanging lines 12. The gill net 14 is fixed to the extra line 13. Reference numeral 6 designates a line or string for securing the float 1 to the float line 11.

As compared with the conventional floats, the float of the present invention is easy to fit to the net and stable in operation and may advantageous reduce the number of hanging lines, thereby facilitating the handling.

The present invention has been so far described with particular reference to the preferred embodiment thereof, but it will be understood that variations and modifications can be effected without departing from the true spirit of the present invention as described hereinabove and as defined in the appended claims.

What is claimed is:

1. A float for gill net made of a floating material characterized in that said float is provided with a bore for receiving therein a float line and two hanging line bores formed transversely with resect to said float line bore without intersecting therewith.

2. A float as defined in claim 1 wherein reinforcing materials are fixed to the openings of said float line bore and hanging line bores.

3. A float as defined in claim 1 wherein said floating material is a closed-cellular foamed synthetic resin body.

4. A float as defined in claim 1 wherein said hanging line bores are formed at right angles with respect to said float line bore.

References Cited
UNITED STATES PATENTS
2,897,625   8/1959   Spitzli et al. _____ 43—43.1
3,392,475   7/1968   Vakousky _____ 43—44.9

WARNER H. CAMP, Primary Examiner

U.S. Cl. X.R.
43—10